(12) United States Patent
Dye et al.

(10) Patent No.: US 8,234,835 B2
(45) Date of Patent: Aug. 7, 2012

(54) INTEGRATED MULTILAYER INSULATION

(75) Inventors: Scott A. Dye, Morrison, CO (US); Gary L. Mills, Boulder, CO (US)

(73) Assignee: Quest Product Development Corporation, Wheat Ridge, CO (US)

( * ) Notice: Subject to any disclaimer, the term of this patent is extended or adjusted under 35 U.S.C. 154(b) by 153 days.

(21) Appl. No.: 12/493,852

(22) Filed: Jun. 29, 2009

(65) Prior Publication Data

US 2010/0252698 A1   Oct. 7, 2010

Related U.S. Application Data

(63) Continuation-in-part of application No. 12/041,326, filed on Mar. 3, 2008, now Pat. No. 7,954,301.

(60) Provisional application No. 60/895,349, filed on Mar. 16, 2007.

(51) Int. Cl.
    *E04C 2/54* (2006.01)
(52) U.S. Cl. ............... 52/783.1; 52/788.1; 244/171.7
(58) Field of Classification Search ............. 52/782.1, 52/783.1, 784.14, 788.1, 793.1, 794.1; 428/68, 428/76, 120; 244/159.1, 171.7; 220/560.12, 220/560.13; 200/341, 344, 345
See application file for complete search history.

(56) References Cited

U.S. PATENT DOCUMENTS

| | | |
|---|---|---|
| 3,616,139 A | 10/1971 | Jones |
| 3,649,426 A | 3/1972 | Gates, Jr. |
| 3,799,056 A | 3/1974 | Colignon |
| 3,884,646 A | 5/1975 | Kenney |
| 3,894,372 A | 7/1975 | Roberts et al. |
| 3,941,964 A * | 3/1976 | Yoder ............... 200/516 |
| 4,336,292 A | 6/1982 | Blair |
| 4,400,927 A | 8/1983 | Wolde-Tinase |
| 4,683,154 A | 7/1987 | Benson et al. |
| 4,707,393 A | 11/1987 | Vetter |
| 5,038,693 A | 8/1991 | Kourtides et al. |
| 5,100,725 A | 3/1992 | Pearson |
| 5,107,649 A | 4/1992 | Benson et al. |
| 5,157,893 A | 10/1992 | Benson et al. |
| 5,175,975 A | 1/1993 | Benson et al. |
| 5,230,941 A | 7/1993 | Hollander et al. |

(Continued)

FOREIGN PATENT DOCUMENTS

GB   2291672 A   1/1996

OTHER PUBLICATIONS

Restriction Requirement for U.S. Appl. No. 12/041,326, mailed Dec. 3, 2009, 5 pages.

(Continued)

*Primary Examiner* — Jeanette E Chapman
*Assistant Examiner* — Daniel Kenny
(74) *Attorney, Agent, or Firm* — Polsinelli Shughart PC

(57) ABSTRACT

A multilayer insulation with an array of posts is provided. In particular, the posts are comprised of multiple post or support elements that are interconnected to radiation shields or sheets comprising the layers of the integrated multi-layer insulation (IMLI) structure. The support elements maintain spacing between adjacent sheets, thus maintaining a volume between the sheets. The support elements can each feature a plurality of support arms. The support elements can each additionally include a support beam that defines a minimum spacing between sheets when the IMLI structure is under a compressive load. Neighboring support elements can be interconnected to one another by beams.

21 Claims, 10 Drawing Sheets

U.S. PATENT DOCUMENTS

| | | | |
|---|---|---|---|
| 5,246,759 | A | 9/1993 | Keller |
| 5,270,092 | A | 12/1993 | Griffith et al. |
| 5,318,108 | A | 6/1994 | Benson et al. |
| 5,429,851 | A | 7/1995 | Sallee |
| 5,433,056 | A | 7/1995 | Benson et al. |
| 5,489,321 | A | 2/1996 | Tracy et al. |
| 5,502,292 | A | 3/1996 | Pernicka et al. |
| 5,562,154 | A | 10/1996 | Benson et al. |
| 5,580,620 | A | 12/1996 | Campbell et al. |
| 5,792,539 | A | 8/1998 | Hunter |
| 5,966,888 | A | 10/1999 | Richardson |
| 6,280,814 | B1 | 8/2001 | Offermann et al. |
| 6,423,918 | B1 * | 7/2002 | King et al. ............ 200/406 |
| 6,427,945 | B1 | 8/2002 | Bansemir |
| 6,485,805 | B1 | 11/2002 | Smith et al. |
| 6,739,104 | B2 | 5/2004 | Tokonabe et al. |
| 6,860,082 | B1 | 3/2005 | Yamamoto et al. |
| 7,001,656 | B2 | 2/2006 | Maignan et al. |
| 7,111,752 | B2 | 9/2006 | Bucher et al. |
| 7,169,459 | B2 | 1/2007 | Lichodziejewski et al. |
| 7,288,326 | B2 | 10/2007 | Elzey et al. |
| 7,296,769 | B2 | 11/2007 | Hogenson et al. |
| 7,763,272 | B2 | 7/2010 | Offermann et al. |
| 2007/0089989 | A1 | 4/2007 | Hoagland et al. |

OTHER PUBLICATIONS

R.C. Getty, et al. "Experimental Evaluation of Some Selected Lightweight Superinsulation for Space Vehicles", Advances in Cryogenic Engineering, vol. 11, pp. 35-48 (1966).

C.W. Keller, et al. "Final Report: Thermal Performance of Multilayer Insulations", Lockheed Missiles & Space Co., Prepared for the National Aeronautics and Space Administration, 446 pages (1974).

R.A. Mohling, et al. "Multilayer Insulation Thick Blanket Performance Demonstration, Final Report for the Period Sep. 23, 1986 to May 13, 1987", Ball Aerospace Systems Division, Prepared for Air Force Astronautics Laboratory, 248 pages.

R.A. Mohling, et al. "Multilayer Insulation Thick Blanket Performance Demonstration, Final Report for the Period May 1987 to Dec. 1989", Ball Aerospace Systems Division, Prepared for Air Force Astronautics Laboratory, 131 pages (1990).

Murrill, Mary Beth, Solar System's Best-Outfitted Spacecraft Dons Its Thermal Cloak, California Institute of Technology Press Release, Jan. 3, 1997, NASA, Pasadena, California, available at www.jpl.nasa.gov/releases/97/csblank.html.

Doody, Dave, "Typical Onboard Systems", Basics of Space Flight, Chapter 11, Feb. 2001, California Institute of Technology, NASA, Pasadena, California, available at www2.jpl.nasa.gov/basics/bsf11-4.html.

Stultz, James W. and Reeve, Ronald T., Test-Derived Effective Emittance for Cassini M1. Blankets and Heat Loss Characteristics in the Vicinity of Seams, Abstract, Jun. 1995, California Institute of Technology, Pasadena, California.

M. Donabedian, et al. "Chapter 5: Insulation", Satellite Thermal Control Handbook (David G. Gilmore, ed.), The Aerospace Corporation, El Segundo, California, 24 pages (2002).

Buchanan, Leslie and Buerger, Steve, High Performance MLI for Cryogenic Hardware, Mar. 13, 2003, Ball Aerospace & Technologies Corp., Boulder, CO.

Multi-layer Insulation, Wikipedia, last modified May 19, 2009, Wikipedia Foundation, Inc., available at http://en.wikipedia.org/wiki/Multi-layer_insulation.

International Search Report and Written Opinion for International Application No. PCT/US2010/039352, mailed Aug. 24, 2010.

International Search Report and Written Opinion for International Application No. PCT/US2010/039352, mailed Aug. 24, 2010, 8 pages.

Official Action for U.S. Appl. No. 12/041,326, mailed Oct. 7, 2010, 12 pages.

* cited by examiner

INTEGRATED MULTILAYER INSULATION

CROSS REFERENCE TO RELATED APPLICATIONS

This application is a continuation in part of U.S. patent application Ser. No. 12/041,326, filed Mar. 3, 2008, which claims the benefit of U.S. Provisional Patent Application Ser. No. 60/895,349, filed Mar. 16, 2007, the entire disclosures of which are hereby incorporated herein by reference.

STATEMENT REGARDING FEDERALLY SPONSORED RESEARCH OR DEVELOPMENT

The U.S. Government has a paid up license in this invention and the right in limited circumstances to require the patent owner to license others on reasonable terms as provided for by the terms of contract numbers NNC07QA33P and NNC08CA13C awarded by the National Aeronautics and Space Administration.

FIELD

The present invention relates generally to thermal multilayer insulation (MLI).

BACKGROUND

Multilayer insulation (MLI) is used in applications requiring lightweight, high performance thermal insulation for aerospace applications such as spacecraft, cryogenic propellant tanks including liquid hydrogen tanks for aircraft, cryogenic refrigerators, and instruments. MLI is typically used in a high vacuum ($<10^{-2}$ Pascal) where its performance exceeds alternative insulations by a factor of ten. However, the heat flow through the MLI is usually the major heat leak in cryogenic systems, so improvements in thermal performance would be desirable.

In cryogenic space propulsion applications, an insulation system that has high performance on orbit is required. However, the insulation must also provide adequate performance during pre-launch and launch to prevent heat gain, boil off of cryogenic propellants, and condensation or frost formation on the insulation outer surface. Also, the insulation is required to have a low mass, so that the payload capacity of the vehicle used to place the system in orbit is not unduly affected.

Current multilayer insulation consists of layers of metalized polymer sheets that are separated by fabric web or net, typically made of silk or polyester. The fabric net is often attached to the polymer sheets only at the edges. The thermal and mechanical contact between the net and sheets is not well controlled and therefore the conductance through the layers is difficult to predictably characterize. The net is a soft fiber material that has a high thermal contact conductance. Use of the insulation within the atmosphere requires a vacuum shell that does not put a compressive load on the insulation. Such a vacuum shell is inherently heavy (on the order of 10 kg/m^2) and difficult to make more lightweight because the shell has to resist buckling under external loading of atmospheric pressure over 10,000 kg force per square meter.

Other MLI technologies using a multi-layer honeycomb sandwich material for structures are light in weight and can be made very rigid relative to their weight. However, the insulation performance of such structures has been less than desired.

Accordingly, there is a need for a lightweight, high performance thermal insulation for critical missions such as NASA's next generation spacecraft for space exploration mission. Insulation that can provide high thermal performance both in-atmosphere and on-orbit (in vacuum) is critical to the success of NASA Exploration spacecraft.

SUMMARY

Embodiments of the present invention provide a high performance integrated thermal insulation (IMLI) structure that includes a plurality of thermal radiation shields, also referred to herein as sheets. The sheets may comprise layers of metalized polymer material, separated by a rigid polymer structure that includes a plurality of support posts. The polymer structure can be thermally and structurally optimized to minimize the thermal conduction for the operating conditions. The structure is designed so that the insulation performance will not be significantly affected by compression effects due to gravity, allowing the low-gravity performance to be better predicted from ground testing, more consistent between regular gravity and low gravity performance, and less sensitive to labor and assembly variations. The insulation structure can be made strong enough to support a thin, lightweight vacuum shell, which will greatly reduce the mass of the overall insulation system when operation in the atmosphere is required. The use of a rigid polymer structure may also facilitate the automation of the insulation fabrication and the handling of the insulation, reducing labor costs.

In accordance with embodiments of the present invention, the polymer structure is arranged so that support posts are comprised of staggered post elements, such that, for a given support post, not every space between adjacent sheets includes a post element for that support post. For example, the post elements of a given support post may be disposed between every other pair of alternate sheets. In addition, the spaces between adjacent sheets in which post elements from neighboring support posts are disposed may alternate, such that for a space in which a first support post has a first post element the second support post does not have a post element, and for a space in which the first support post does not have a first post element, the second support post does have a post element, and so on. This configuration, which introduces gaps between the individual post elements of the support posts, at least when the IMLI structure is subject to reduced atmospheric pressure, reduces thermal conductivity of the insulation structure as compared to an embodiment with post elements in each space between adjacent sheets. Alternatively, some post elements disposed between sheets may comprise partial post elements that allow gaps in their respective support posts to form when the IMLI structure is subject to reduced pressure. As yet another alternative, some or all of the support posts may include a complete post element in each space between the sheets, forming a continuous support structure even when the IMLI structure of system is in a vacuum.

In accordance with further embodiments of the present invention, beams or partial beams within spaces between adjacent sheets may be provided to interconnect neighboring support posts to one another or to support the next upper sheet. By providing beams, the alignment of support posts and the included post elements can be better controlled, particularly during assembly and installation of the IMLI structure. If provided, beams can be disposed within one or more of the spaces between adjacent sheets. Also, the beams can be disposed between all of the posts within the IMLI structure, or can be segmented. An example of a segmented arrangement is to connect groups of four posts to one another by an arrangement of beams defining a square consisting of four posts. Moreover, connections between adjacent groups of posts using beams can be omitted, for example to facilitate cutting the IMLI structure to a desired size. Beams can be incorporated into embodiments that include continuous posts, or posts that have staggered post elements or posts that have partial beams projecting out from the post.

In accordance with embodiments of the present invention, support posts can include post or support elements with a plurality of support arms. The support arms may extend between a top or first surface and a base or second surface. Moreover, the support arms may extend from the top platform at an angle, such that the length of each support arm is greater than the distance between the top surface of the base surface. The first surface may be formed by a top structure and the second surface may be formed by a base structure. In accordance with embodiments of the present invention, the base structure may comprise an annular structure. Each support arm has a relatively small cross-sectional area, and a relatively long length. In accordance with embodiments of the present invention, the support arms may be arranged in a tripod configuration.

In accordance with further embodiments of the present invention, a support element may include a plurality of support arms and a support beam. The plurality of support arms may extend from a top platform at an angle, such that the length of each support arm is greater than a distance between a first or top surface defined by the top platform and a second or base surface. Moreover, the support arms may be arranged radially around the support beam. In addition, the length of the support beam may be less than the distance between the first and second surfaces, at least when the support element is in an uncompressed state. In a compressed state, the support beam may define a minimum distance between the first and second surfaces.

In accordance with other embodiments of the present invention, the post elements can be metalized in order to reduce the infrared emission of the elements. If the post elements are metalized, gaps in the metalization, for example in the form of grooves or rings, may be provided to reduce or eliminate the conductive paths that would otherwise be created as a result of the metalization. Similarly, if beams are provided, they may also be metalized. Additional features and advantages of embodiments of the present invention will become more readily apparent from the following description, particularly when taken together with the accompanying drawings.

DETAILED DESCRIPTION

Figure 1:
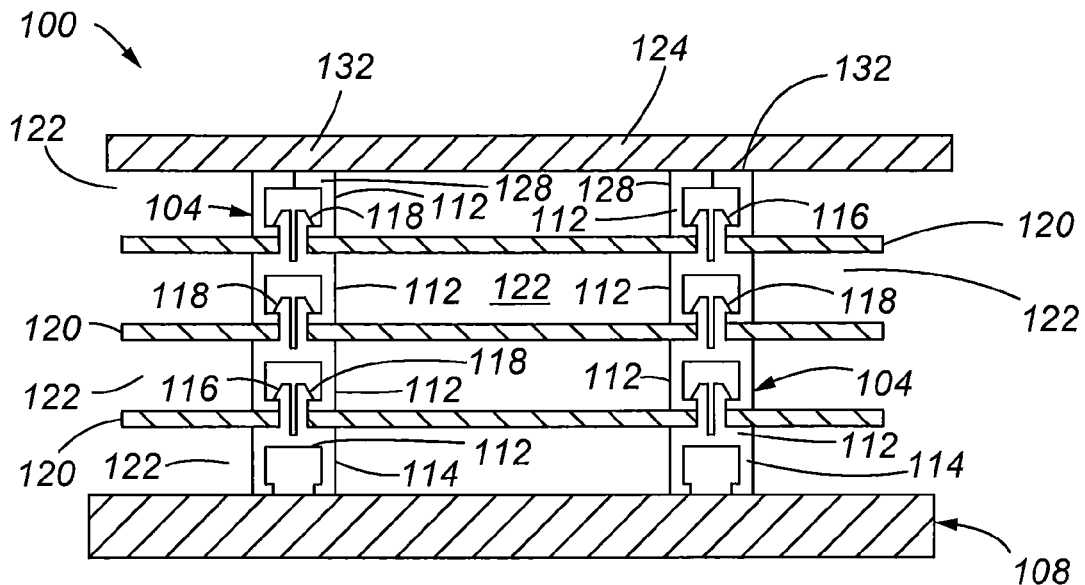
FIG. 1 is a cross section of an integrated multilayer insulation structure in accordance with embodiments of the present invention, in which the posts are attached to each other in a continuous in-line configuration.

The present invention is directed to an integrated multilayer insulation (IMLI) structure. As shown in FIG. 1, the IMLI structure 100 in accordance with embodiments of the present invention can include support posts 104 that each comprise a number of post or support elements 112. The support posts 104 generally support and maintain a space or separation 122 between adjacent thermal radiation shields (also referred to herein as sheets) 120. A base post element 114 in each support post 104 can be bonded or otherwise interconnected to a base structure or layer 108. The base layer 108 can be the radiation shield 120 comprised of the layer of polymer or other material immediately adjacent the item being insulated, or it can be the item being insulated. The support posts 104 can comprise a number of stacked post elements 112. The post elements 112 may be interconnected to one another to form a continuous support post 104 structure using mechanical attachments, fasteners, magnets, molecular or electrical bonding, solvent bonding, an adhesive or by polymer welding 116, either directly or with a portion of a sheet 120 between. An interconnection 116 comprising a mechanical attachment 118 can be any of a variety of designs, including the snap fastener shown in FIG. 1.

The mechanical attachment 118 can hold the post elements 112 loosely together, so that the mechanical attachment 118 does not add to the compressive force on the support posts 104. The mechanical attachment 118 traps individual sheets or layers comprising the radiation shields 120 of the IMLI structure 100 in between the post elements 112 of the support posts 104. The sheets 120 are thus spaced apart from one another. For example, in the embodiment illustrated in FIG. 1, the sheets 120 are spaced apart from one another by a distance equal to the height of the post elements 112 interposed between adjacent sheets 120. Alternatively, post elements 112 can be adhered or bonded to a sheet 120 opposite one another to create continuous support posts 104. The sheets 120 may be formed from a metalized polymer with a low emissitivity surface, such as silverized, goldized, aluminized MYLAR (polyethylene terephthalate polyester film) or KAPTON (polyimide film), or from a thin, low emissitivity metal such as aluminum or tungsten foil.

The post elements 112 may be fabricated from a molded polymer with low thermal conductivity, high compressive strength and hardness and low vacuum outgassing such as polyetherimide, polyimide, polyamide-imide, polyethyl ketone or wholly aromatic copolyesters, or from high-temperature spacer materials such as alumina or ceramic. As an example, the post elements 112 may be formed from ULTEM (polyetherimide) or PEEK (polyetheretherketone). The post element 112 surface that contacts a sheet 120 can be made with a rough texture, such as grooves, to minimize the contact conductance between post elements 112 of a post 104 and the sheet 120 and the post elements 120 of adjacent posts. Moreover, the use of support posts 104, which have a relatively limited contact area with the sheets 120 that are supported, can reduce conduction through the structure 100 as compared to structures using a honeycomb, web, net or other support structure. In accordance with embodiments of the present invention, the area of a sheet 120 surface that is in contact with a support post 104 is less than 3% of the total area of that sheet 120 surface. In accordance with other embodiments, the area of the sheet surface in contact with a support post 104 is less than 1% of the total area of that sheet 120 surface.

Embodiments of the invention can be used in connection with providing a vacuum insulation requiring all the spaces or volumes 122 between sheets 120 to be evacuated to a high vacuum (less than $10^{-2}$ Pa). If the integrated multilayer insulation structure 100 is to operate in the atmosphere, an air tight top or outer layer 124 (also referred to herein as hermetic layer 124) of thin metal, polymer or other material can be bonded or mechanically attached to the top or outermost surface of the support posts 104. As used herein, "top" or "outermost" surface of the support posts 104 refers to the surface of the top post elements 128, which are the layer or course of post elements 112 that are generally the farthest from the base layer or the item being insulated 108. This top surface of the support posts 104 may be formed using top post elements 128 that provide a suitable mounting surface 132.

The spaces between the sheets or layers 120 defining the volumes 122 can be evacuated to a high vacuum (less than $10^{-2}$ Pa) and the support posts 104 are put in compression due to the atmospheric pressure. A vent path 136 (see FIG. 3) through the interior of the posts 104 can be provided to facilitate the evacuation of the interior volumes of the posts 104. An IMLI insulation structure 100 with an integrated vacuum tight hermetic layer 124 in accordance with embodiments of the present invention can potentially be much lighter than a conventional MLI combined with a separate vacuum shell. Since the hermetic layer 124 is supported by the underlying insulation, it can be thinner and lower mass than conventional vacuum shells. In addition, the performance of the IMLI structure 100 is more predictable than conventional MLIs, as it is not as subject to any or as much performance variation under different compressive loads. For laminated insulators having comparable numbers of layers of radiation shields and/or layer spacing, the IMLI insulation structure 100 would have a somewhat higher conductance than a conventional MLI if the IMLI were designed to withstand a one atmosphere load. An IMLI structure 100 in accordance with embodiments of the present invention can have significantly lower conductance than a conventional MLI when it does not need to be designed for a one atmosphere structural load.

Figure 2:
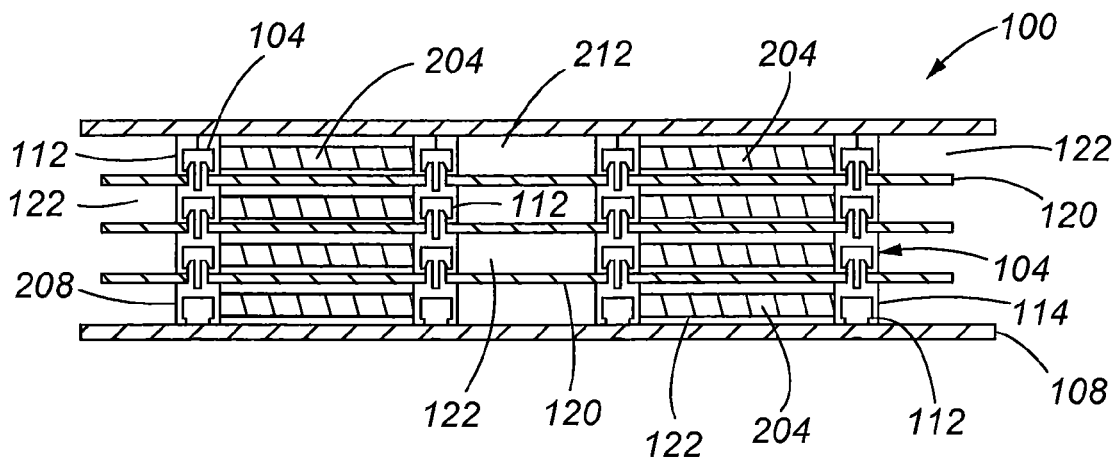
FIG. 2 is a cross section of an integrated multilayer insulation structure with beams between posts in accordance with embodiments of the present invention.
Figure 4:
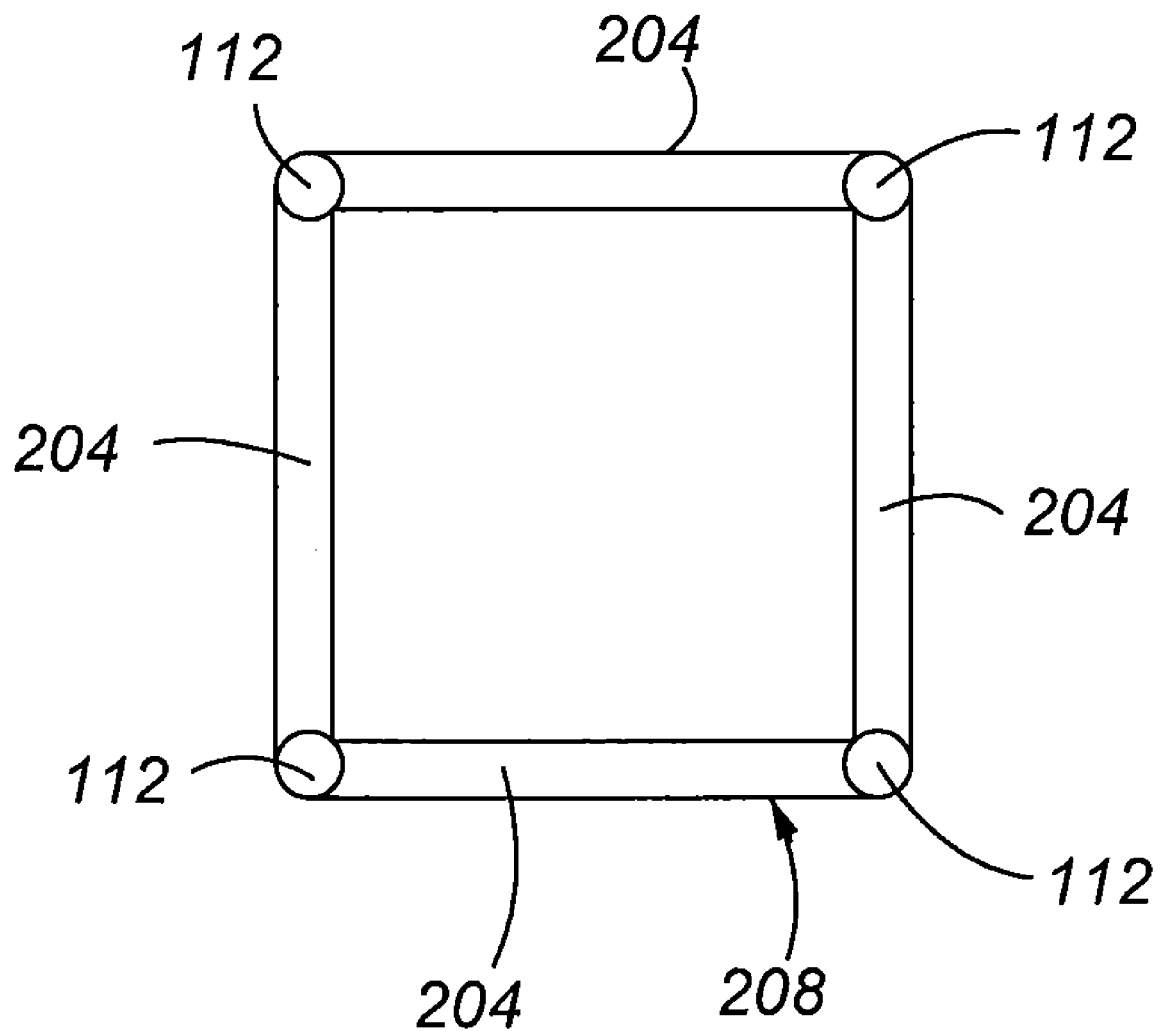
FIG. 4 is an illustration of a grid element in plan view in accordance with embodiments of the present invention.

FIG. 2 illustrates an IMLI structure 100 in accordance with other embodiments of the present invention. In particular, some or all of the support posts 104 are connected to adjacent support posts 104 by beams 204. In accordance with embodiments of the present invention, the beams 204 may be fabricated from the same material as the post elements 112. In accordance with still other embodiments of the present invention, the beams 204 may be provided as part of grid elements or integral beam and post structures 208 comprising four post elements 112 and four beams 204. An example integral beam and post structure 208 is illustrated in plan view in FIG. 4. The purpose of the beams 204 is to assist in the handling and alignment of the post elements 112 during assembly, and to reinforce the buckling strength of the support posts 104. The beams 204 can be arranged so they connect all the support posts 104 in a two-dimensional grid. Alternatively, the beams 204 can be arranged so there are gaps in the grid pattern 212, as shown, to reduce mass, provide flexibility to the structure 100 and to provide a place to more easily cut the assembly. The beams 204 can also be disposed within each volume 122 between adjacent sheets 120, or in less than every volume 122. As yet another alternative, groups of post elements 112 formed by interconnecting post elements 112 with beams 204 in a first number of the volumes 122 can be connected to other groups of post elements 112 by beams 204 in a second number of volumes 122, where the first number is greater than the second number, to provide greater control of the separation of adjacent support posts 104 while also facilitating cutting of the IMLI structure 100. Other arrangements or combinations of beams 204 and post elements 112 are also possible.

Figure 3:
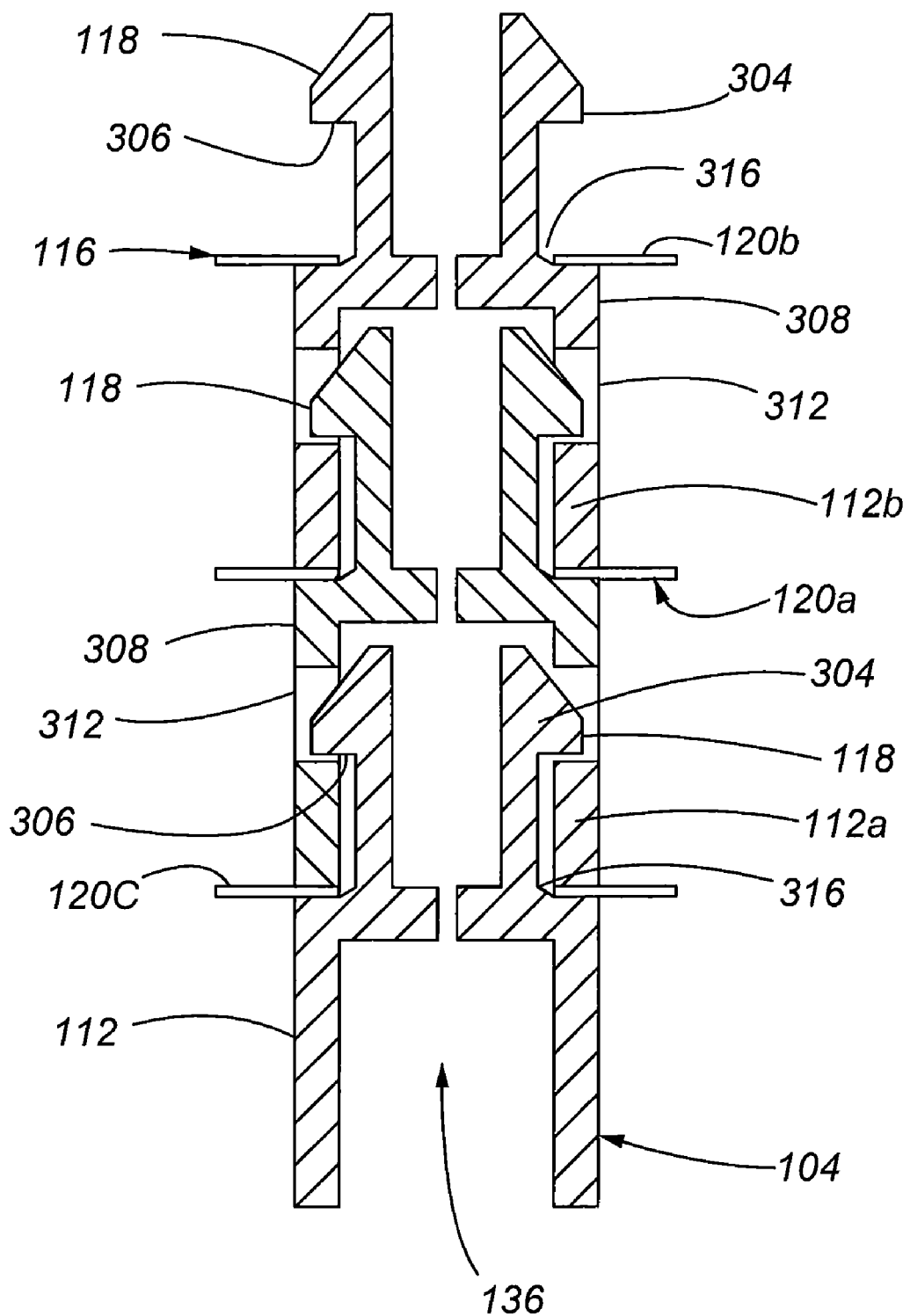
FIG. 3 is a cross section of a detail of a post design and mechanical fastener in accordance with embodiments of the present invention.

FIG. 3 shows a detail of a support post 104 design incorporating a snap fastener or mechanical attachment 118 that could be readily molded. According to this design, a post element 112 includes flexible tabs 304 with a flat (or angled) locking surface 306 that are molded onto or integral with a post element body 308. A through slot 312 that the tabs 304 on the adjacent post element 112 snap into so that the locking surface 306 engages the slot 312 may be provided to hold interconnected post elements 112 together. In accordance with further embodiments of the present invention, top post elements 128 for use at a top or outer layer of insulation may omit the tabs 304, and instead terminate at the top of the post element body 308 in an attachment or terminal surface (e.g., surface 132 shown in FIG. 1).

FIG. 3 also illustrates how the sheets 120 can be joined to the support posts 104. In particular, the sheets 120 may be provided with perforations 316 having a diameter that is greater than the distance between tabs 304, but less than the diameter of the post body 308. Accordingly, by placing the tabs 304 of a first post element 112 through a perforation 316 in a first sheet 120a, and by then joining the first post element 112a to a second post element 112b, the first sheet 120a can be trapped between the two post elements 112a and 112b and thus can be held at a desired spacing from other sheets 120b and 120c on either side of the first sheet 120a.

Additional mechanical methods exist for attaching the posts to each other. Hook and loop ("Velcro") or interlocking mushroom shaped attachments have been developed for other applications and could be used to attach stacked post elements 112. As further examples, sewing or stapling could be used.

An alternative approach is to provide an interconnection 116 comprising magnets to enable the post elements 112 to be attached to each other magnetically. The post elements 112 could have magnets bonded, post molded or over-molded into the ends that would be attracted to magnets of opposite polarity on other post elements 112. As still another alternative, each post element 112 can be bonded or adhered to the sheet or sheets 120 that it is in contact with using, as examples, polyurethane adhesive, epoxy adhesive, or pressure sensitive adhesives. In addition, embodiments of the present invention can use sheets 120 that are not perforated. For example, embodiments in which post elements 112 are adhered to the sheets 120 can benefit from the use of unperforated sheets 120, as thermal radiation through the structure 100 can be reduced by eliminating perforations in the sheets 120. Unperforated sheets 120 can also be used in combination with post elements 112 that pierce the sheet 120 between two post elements 112 when those post elements are interconnected to one another.

Figure 5:
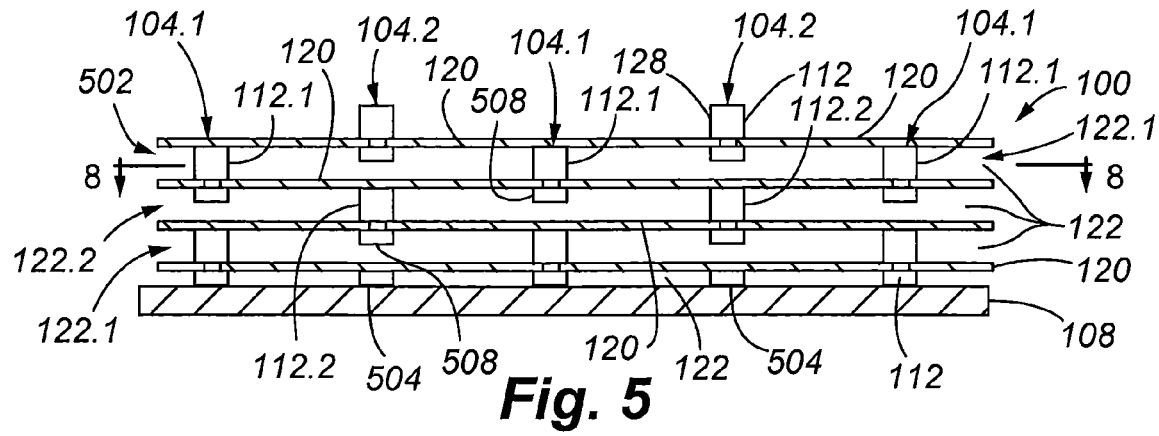
FIG. 5 is a cross section of an alternative embodiment of the invention in which the posts are configured with post elements that are in a staggered arrangement and are attached to the sheets but not to each other.

FIG. 5 illustrates in elevation an IMLI structure 100 in accordance with embodiments of the present invention in which the post elements 112 are configured in a staggered arrangement and are attached to the sheets 120 but not to each other, either directly or through intermediate sheets 120. In particular, a first set of support posts 104.1 includes post elements 112.1 that extend across the space between sheets 120 with respect to a first set of volumes 122.1, but that do not extend across a volume 122.2 included in a second set of volumes, at least when the top most post elements 112 are not subject to a compressive load. Similarly, a second set of support posts 104.2 include post elements 112.2 that extend across volume 122.2, but that do not extend across any volume in the first set of volumes 122.1. This has the effect of reducing the thermal conductivity of the insulation structure 100, because conduction between post elements 112 included within a support post 104 is interrupted by the gaps between post elements 112, and the conduction path between posts is through the thin sheets. Accordingly, an application of an IMLI structure 100 in accordance with such embodiments is as a replacement for conventional multilayer insulation where a high vacuum can be obtained, such as through the provision of a vacuum shell or in the case of spaceflight, the ambient environment. As shown by the line 502 of support posts 104 visible in the figure, partial post elements 504 can be provided at intervals.

Figure 8:
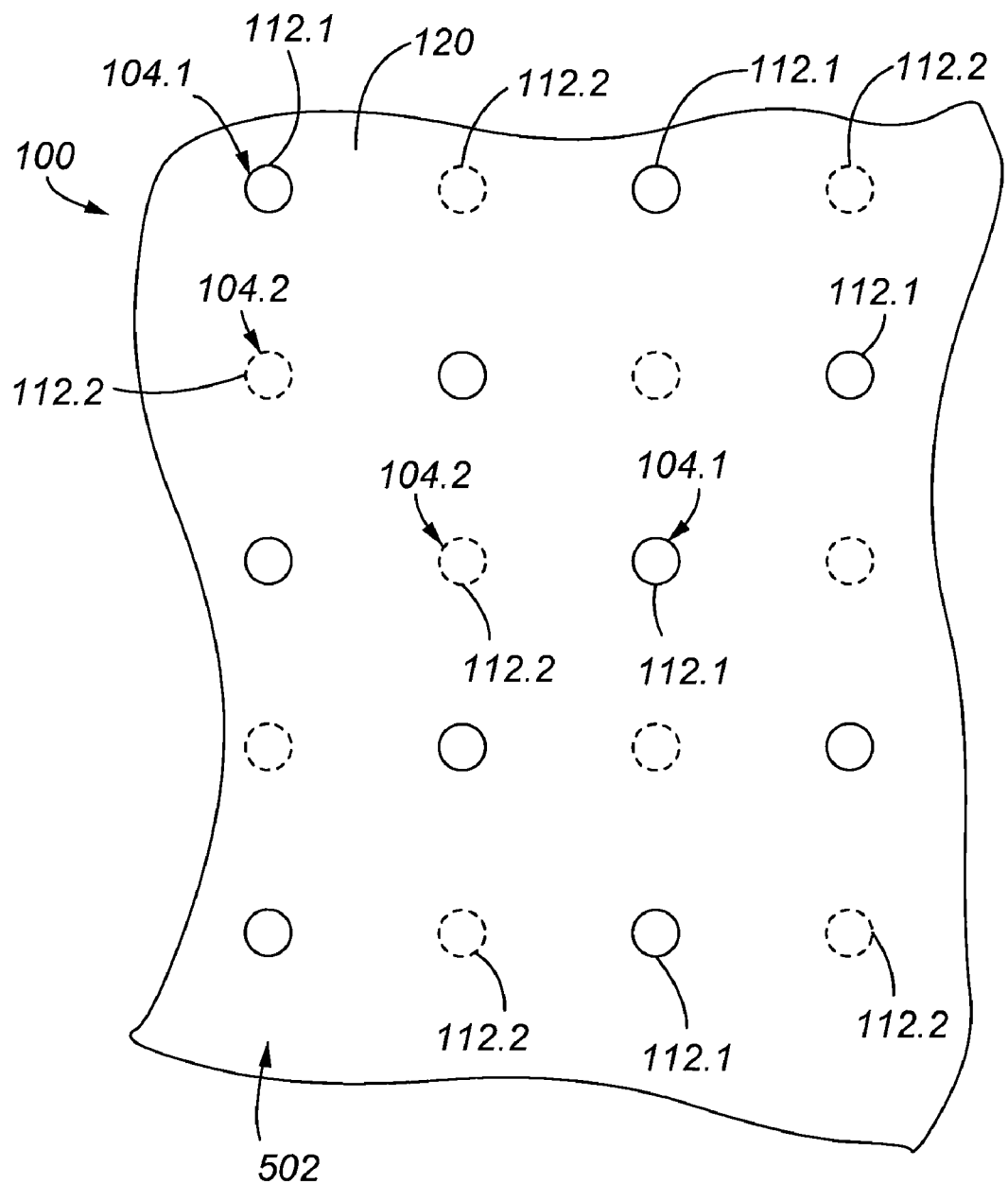
FIG. 8 is a plan view of a portion of the embodiment of the invention illustrated in FIG. 5.

FIG. 8 is an illustration of the IMLI structure 100 of FIG. 5, in plan view and taken along section line 8-8 of FIG. 5. As depicted in FIG. 8, the post elements 112.1 of a first course or layer of the IMLI structure 100 alternate with the post elements 112.2 of a second course or layer.

Figure 6:
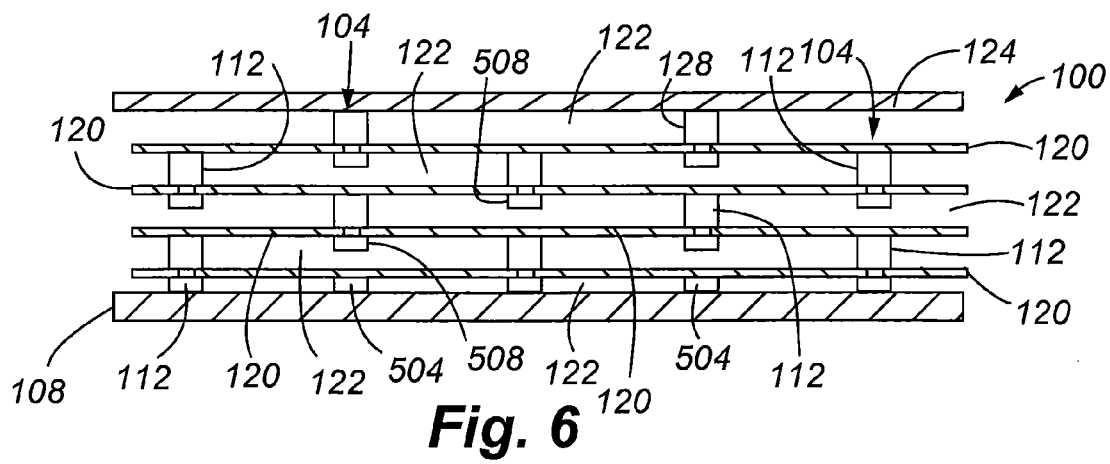
FIG. 6 is a cross section of the staggered post arrangement with a hermetic outer layer.

FIG. 6 illustrates the IMLI structure 100 of FIG. 5 being used to support a hermetic outer layer 124 while the IMLI structure 100 is itself supported by a tank or other structure comprising the base layer 108. A high vacuum is acquired between the insulation layers 120. As shown in FIG. 6, when there is no atmospheric pressure on the outside of the hermetic layer 124, the sheets 120 are approximately flat and the post elements 112 within each support post 104 are separated from each other, breaking conductive paths that would otherwise exist between post elements 112.

Figure 7:
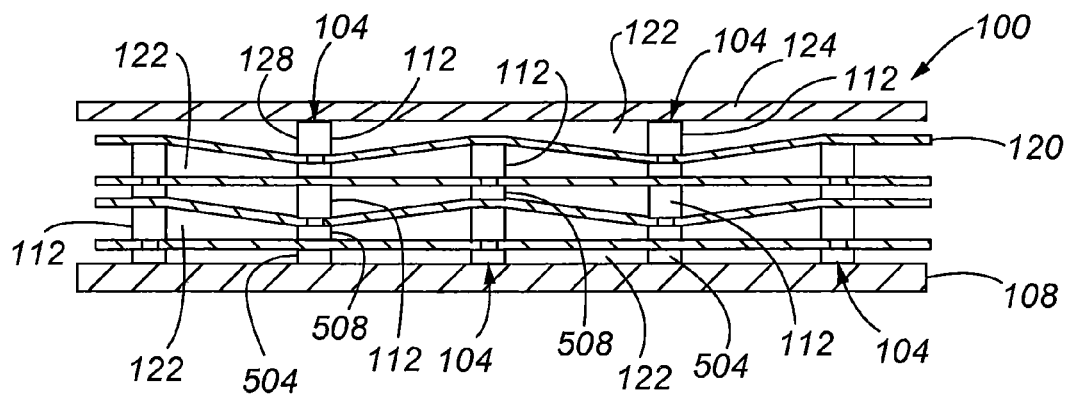
FIG. 7 is a cross section of the staggered post arrangement with a hermetic outer layer compressed by an external load.

When there is atmospheric pressure on the outer hermetic layer 124, the IMLI structure 100 is compressed until the post elements 112 within each support post 104 support each other to transfer the load of the atmosphere on the hermetic layer 124 to the base layer 108 as shown in FIG. 7. In accordance with embodiments of the present invention, the size of the post elements 112 and their spacing is sufficient to support a one atmosphere load when the insulation 100 is in the compressed configuration, while preventing contact between adjacent sheets 120. As illustrated, the partial posts 504 prevent direct contact and maintain a volume 122 between the base structure or layer 108 and the first sheet 120 for those posts 104 that do not have a post element interconnected to the first sheet 120. In addition, post elements 112 may include an extension 508 to prevent direct contact between sheets 120. When the atmospheric load is reduced such as in spaceflight, the polymer sheets 120 elastically return to a flat shape, and the post elements 112 separate from each other as shown in FIG. 6. This reduces the heat transfer between layers and allows for higher insulation performance during spaceflight.

Figure 9:
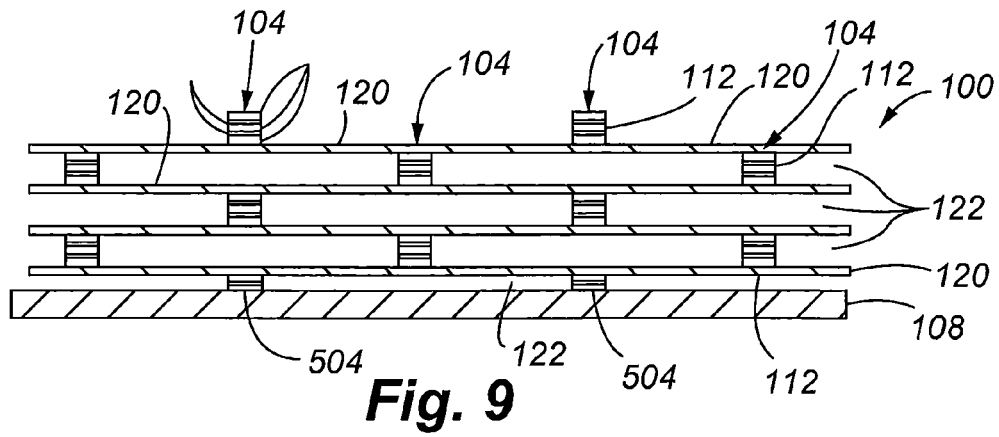
FIG. 9 is a cross section of another alternative embodiment of the invention in which the posts are configured with post elements that are in a staggered arrangement and are adhered to the sheets but are not interconnected to each other.

With reference now to FIG. 9, an IMLI structure 100 in accordance with other embodiments of the present invention is illustrated. In particular, the structure 100 illustrated in FIG. 9 includes post elements 112 that are configured in a staggered arrangement, similar to the embodiment illustrated in FIG. 6. However, in FIG. 9 each of the post elements 112 are adhered to a surface of a radiation shield of sheet 120, rather than being mechanically attached to the sheet 120. Moreover, in this embodiment, the sheets 120 are not perforated, and thus a post element 112 does not extend to either side of the sheet 120 to which it is attached. Alternatively, a post element 112 adhered to one side of a sheet 120 can be paired with a partial post element 504 or an extension adhered to the opposite side of the sheet so that in profile the post element 112 appears like the post elements as shown in FIG. 5, but no perforations in the sheets 120 are required. By eliminating perforations in the sheets 120, thermal radiation through the IMLI structure 100 is reduced as compared to embodiments in which the sheets 120 are perforated.

In addition, the embodiment of the IMLI structure 100 illustrated in FIG. 9 features post elements 112 that have been metalized. In accordance with embodiments of the present invention, a thin (e.g., 500 Å) layer of aluminum, gold, silver or other metal may be deposited on the surface of the post elements 112 to reduce the infrared absorption of the post element 112 as compared to an un-metalized post element 112. By reducing the infrared absorption of the post elements 112, the insulation performance of the structure 100 can be improved. The metallization of post elements 112 may comprise the formation or provision of a metal layer 804 that covers all or substantially all of the exposed surface of the post elements 112. As used herein, substantially all of the exposed surface of a post element 112 comprises at least most of the surface of a post element 112 that is not adhered to or in contact with a sheet 120. The metallization of the post elements 112 can be patterned, so that gaps 808 are formed in the layer of metal 804, thereby interrupting the conductive path along the metalized surface. Accordingly, the degradation in the insulation performance of the IMLI structure 100 caused by creating conductive paths along the post elements 112 due to metallization can be reduced. In accordance with embodiments of the present invention, the layer of metal 804 is created using vapor deposition or other metal deposition techniques. The gaps 808 in the metal layer 804 can be formed by masking the post elements 112 during vapor deposition, or by removing portions of the metal layer 804 by etching or mechanical processes. Similar processes can be used to create gaps in a metal layer formed on beams 204 for embodiments that include beams 204. Alternatively, the gaps need not be formed in the layer of metal, or the gaps need not be complete, to provide electrically conductive post elements 112. Electrically conductive post elements 112 can be used in combination with electrically conductive polymer sheets 120, such as black KAPTON, to provide an electrically conductive IMLI structure 100.

Figure 10:
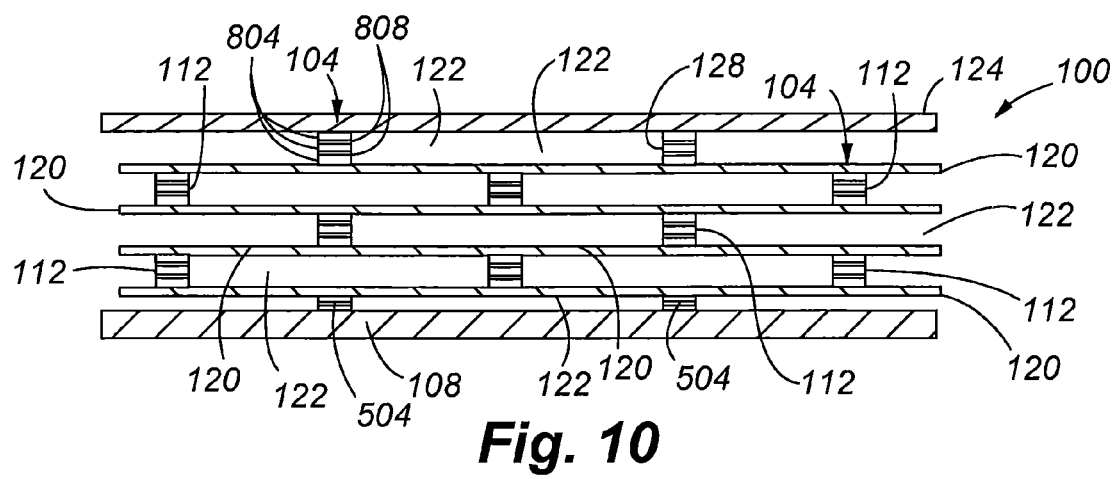
FIG. 10 is a cross section of the other staggered post arrangement with a hermetic outer layer.

FIG. 10 illustrates the IMLI structure 100 of FIG. 9 being used to support a hermetic outer layer 124 while the IMLI structure 100 is in turn supported by a tank or other structure 108. A high vacuum is obtained in the spaces 122 between sheets 120. In addition, FIG. 10 illustrates the configuration of the IMLI structure 100 in the absence of atmospheric pressure. In particular, the support posts 104 are segmented, breaking conductive paths that would otherwise exist along the support posts 104 because of the lack of a compressive load on the IMLI structure 100 when there is no atmospheric pressure on the outside of the hermetic layer 124. More particularly, gaps between the post elements 112 of the support posts 104 are created when the pressure or atmospheric load on the IMLI structure 100 is reduced or removed and the sheets 120 elastically return to a flat (or flatter) configuration.

Figure 11:
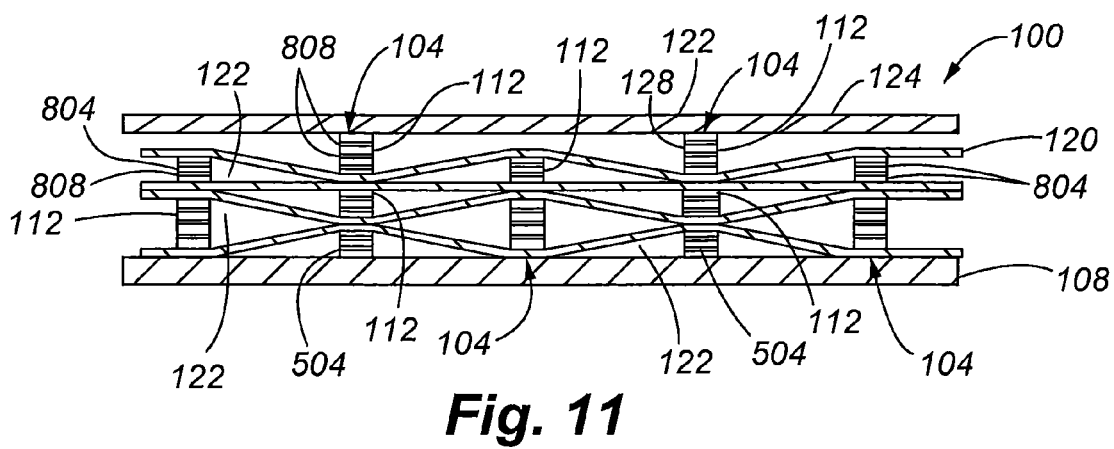
FIG. 11 is a cross section of the other staggered post arrangement with a hermetic outer layer compressed by an external load.

FIG. 11 illustrates the IMLI structure 100 of FIG. 10, when the structure 100 is subject to atmospheric pressure. In particular, the IMLI structure 100 is compressed until the post elements 112 of the support posts 104 support one another. Accordingly, even though the space between the hermetic layer 124 and the base structure or layer 108 is reduced, at least some of the volume and spacing between the sheets 120 of the IMLI structure 100 is maintained. Although the insulation performance of the structure 100 while under atmospheric load is somewhat reduced, due to the decreased spacing and the creation of conductive paths through the support posts 104, that performance is still close to the performance expected of the IMLI structure 100 when the atmospheric load is removed. As a result, the insulation performance and properties of the IMLI structure 100 can be better predicted even when the IMLI structure 100 is subject to such loads, as compared to conventional MLI structures.

Figure 12:
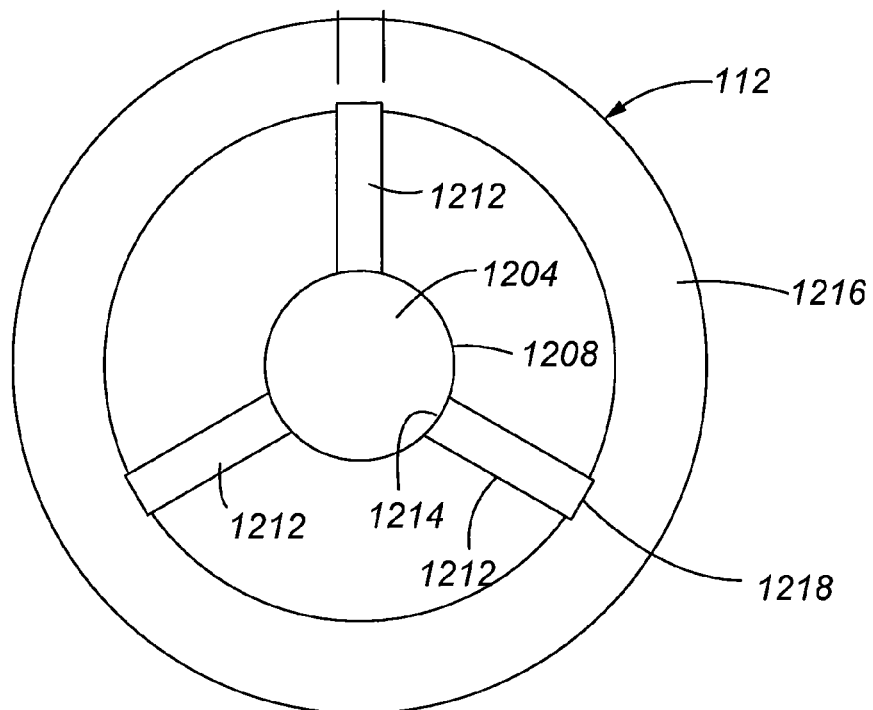
FIG. 12 is a plan view of a support element in accordance with embodiments of the present invention.

FIG. 12 illustrates a post element or support element 112 in accordance with other embodiments of the present invention. In general, the support element 112 includes a first or top surface 1204 formed by a top structure 1208. Extending from the top structure 1208 are a plurality of spokes or support arms 1212. The support arms 1212 terminate at a base structure 1216. The base structure 1216 may comprise an annular structure to which each of the support arms 1212 is connected. Alternatively, the base structure 1216 may be of another form (e.g., triangular, polygonal, semi-circles, etc.). As still another alternative, a base structure 1216 can be omitted. As shown, a first end 1214 of the support arms 1212 may be arranged around a first perimeter or diameter at the top structure 1208, and a second end 1218 of the support arms 1212 may be arranged around a second perimeter or diameter at the base structure 1216. In addition, the first perimeter or diameter may be smaller than the second perimeter or diameter. As can be appreciated by one of skill in the art after consideration of the present disclosure, the terms "top" and "base" are used for convenience of description, but are not limiting as to the orientation of the support element 112. More particularly, as an IMLI structure 100 in accordance with embodiments of the present invention can be oriented in any direction, a top structure 1208 and a base structure 1216 may be oriented such that, at least from the perspective of a viewer, the base structure 1216 is above, below, or at the same elevation as the top structure 1208.

Figure 13:
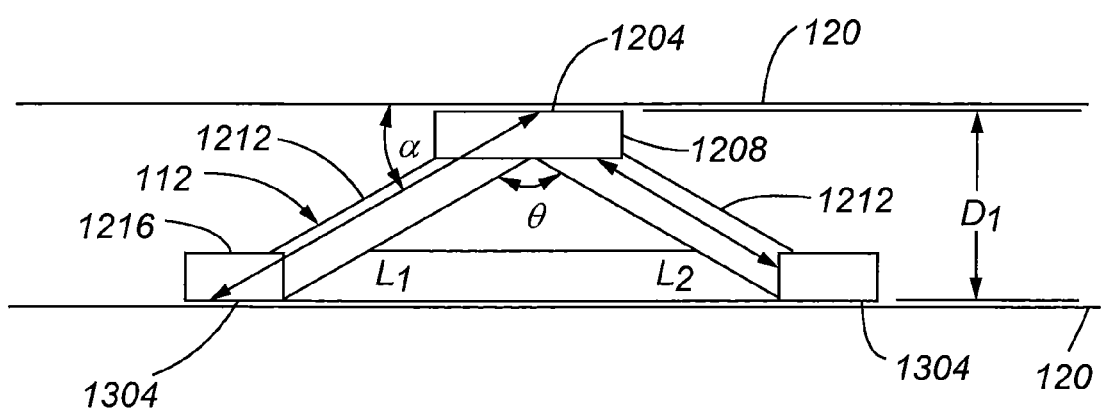
FIG. 13 is a cross-section of the support element shown in FIG. 12.
Figure 14:
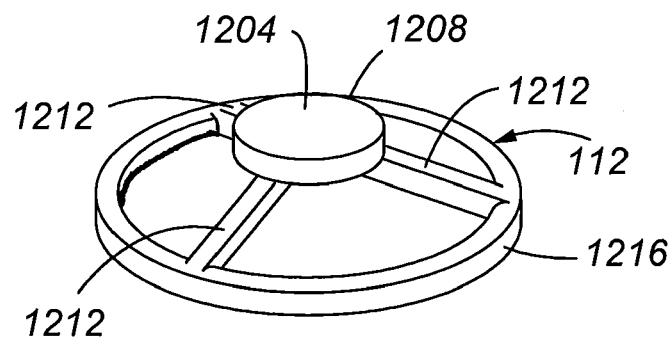
FIG. 14 is a perspective view of the support element shown in FIG. 12.

FIG. 13 is a cross-section of the support element 112 of FIG. 12, and FIG. 14 illustrates that exemplary embodiment in perspective view. As shown in FIG. 13, the support arms 1212 extend from the top structure 1208 at an angle θ with respect to one another. In accordance with embodiments of the present invention, the angle θ is an obtuse angle. The angle α between the plane defined by the top surface 1204 and the support arms 1212 can be from greater than 0° to 90°. In accordance with further embodiments, the angle α can be less than 45°. In accordance with other embodiments, the angle α may be about 20°. In addition, the first or top surface 1204 defined or formed by the top platform 1208 can be seen, as can a second or base surface 1304 formed by the base structure 1216 or by a surface of the support arms 1212 if the support element 112 does not include a base structure 1216. The distance between the plane of the first surface 1204 and the plane of the second surface 1304 is $D_1$. The plane of the first surface can be parallel to the plane of the second surface. In accordance with embodiments of the present invention, the length of a support arm 1212 is greater than the distance $D_1$ between the first surface 1204 and the second surface 1304. More particularly, when measured as the distance $L_1$ between the top structure 1208 and base structure 1216, the length of a support arm 1212 may be greater than the distance $D_1$ between the plane defined by the top surface 1204 and the plane defined by the base surface 1304. Alternatively or in addition, when measured as the distance $L_2$ between the top surface 1204 and the base surface 1304 along the support arm 1212 under consideration, the length of a support arm 1212 is greater than the distance $D_1$ between the plane defined by the top surface 1204 and the plane defined by the base surface 1304.

Figure 15:
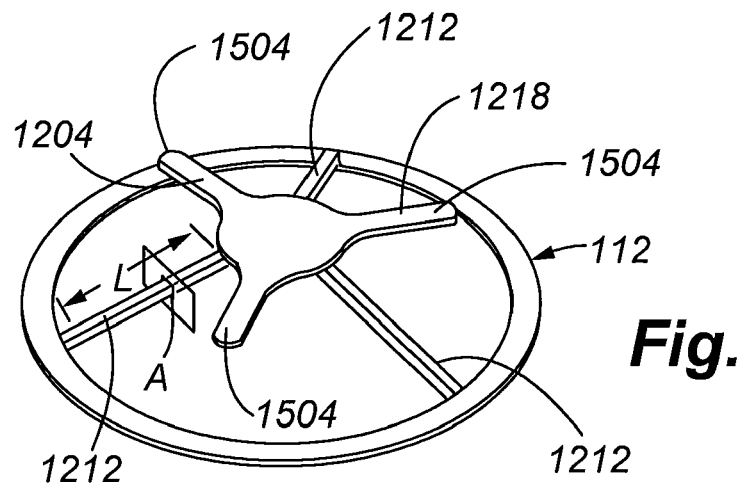
FIG. 15 is a perspective view of a support element in accordance with other embodiments of the present invention.

FIG. 15 illustrates a support or post element 112 in accordance with further embodiments of the present invention. In particular, the top structure 1208 includes a plurality of support surface beams 1504. In addition, the cross-sectional area of the support arms 1212 relative to the length of the support arms 1212 is reduced. In general, the thermal conductivity of a support element 112 is reduced as the ratio of the support arm's 112 cross-sectional area A to the support arm's 112 length L is reduced. Accordingly, the thermal performance of an IMLI structure 100 incorporating the support element 112 can be improved as compared to other support element designs, or as compared conventional designs that utilize a fabric web or net to maintain spacing between layers or sheets. The support surface beams 1504 can provide increased area, for example to adhere to a first sheet or layer 120. The base structure 1216 likewise provides the base surface 1304 to which a second sheet or layer can be adhered.

Figure 16:
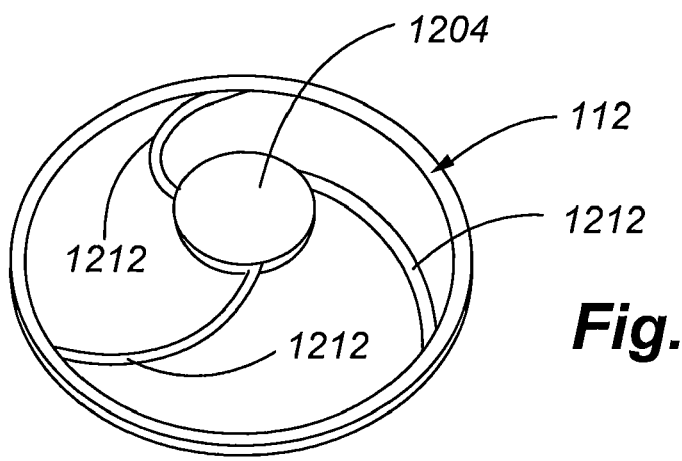
FIG. 16 is a perspective view of a support element in accordance with other embodiments of the present invention.

FIG. 16 illustrates a support element 112 in accordance with still other embodiments of the present invention. As shown, the support arms 1212 are curved. As also shown, the curved support arms 1212 can be arranged in a spiral fashion. Such a configuration allows the area to length ratio of the support arms 1212 to be lowered, by increasing the length as compared to a configuration in which the support arms 1212 have the same cross-sectional area but are straight.

Figure 17:
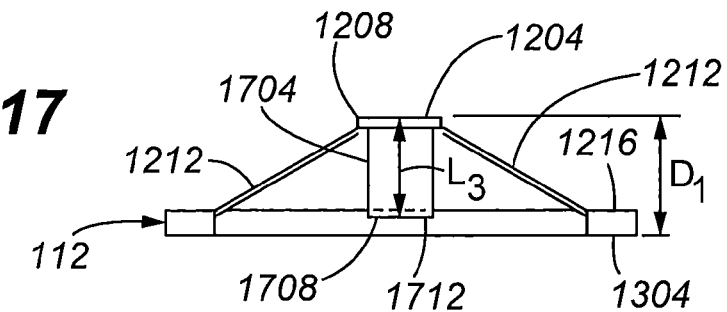
FIG. 17 is a cross-section of a support element in accordance with other embodiments of the present invention.
Figure 19:
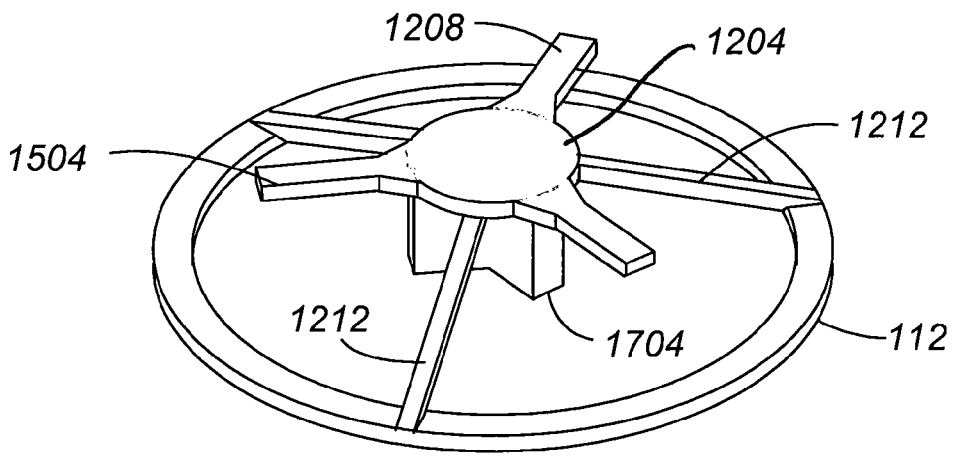
FIG. 19 is a top perspective view of a support element in accordance with other embodiments of the present invention.
Figure 20:
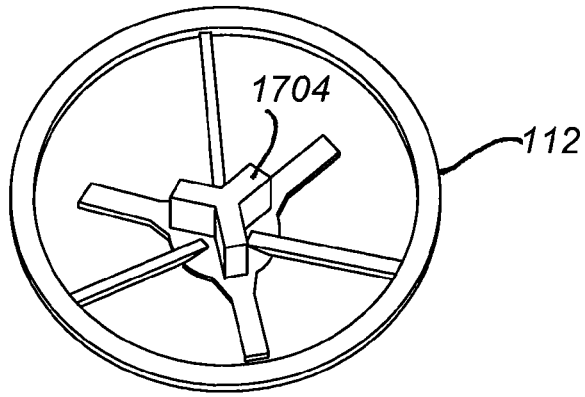
FIG. 20 is a bottom perspective view of the support element of FIG. 19.

FIG. 17 illustrates a support element 112 that in accordance with embodiments of the present invention includes a support beam 1704. The support beam 1704 generally extends from the top structure 1208. The support beam 1704 has a length $L_3$ that is less than the distance $D_1$ between the first surface 1204 and the second surface 1304, at least in the configuration illustrated in FIG. 17. Accordingly, at least in some conditions, a third surface 1708 at the free end 1712 of the support beam 1704 lies between the planes defined by the first 1204 and second 1304 surfaces, and such that a gap exits between the third surface 1708 and any underlying structure (such as a sheet 120). Therefore the support beam 1704 is not in direct contact with the sheet 120 adjacent or attached to the second surface 1304 of the support element 1212, at least while there is no compressive load on the support element 112 or while any compressive load is insufficient to bend the support arms 1212 such that the gap is eliminated. The support arms 1212 may be arranged around the support beam 1704 in a radial fashion and with equal spacing between adjacent support arms 1212 in a tripod configuration, for example as shown in FIGS. 19 and 20. Moreover, a first end 1214 of the support arms 1212 may be arranged around a first perimeter or diameter at the top structure 1208, and a second end 1218 of the support arms may be arranged around a second perimeter or diameter at the base structure 1216. Alternatively, a support element 112 may comprise other numbers or configurations of support arms 1212. Alternatively or in addition, the first end 1214 of the support arms may form the top surface 1204 and may be joined to one another directly, and then a top structure 1208 can be omitted. According to still other embodiments, the top surface 1204 need not be planar. For example, the top surface 1204 can be domed.

Figure 18:
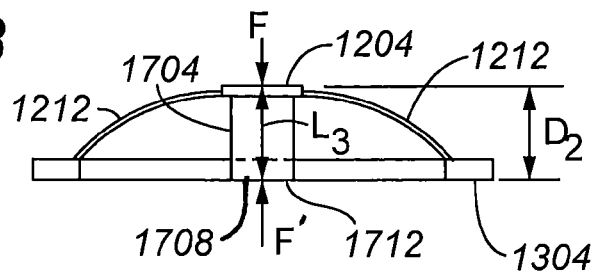
FIG. 18 is a cross-section of the support element of FIG. 17, under compression.

In FIG. 18, the configuration of the support element 112 of FIG. 17 is shown while a compressive force F is applied to the top surface 1204 (and a reactive force F' is present). In this condition, the distance between the first surface 1204 and the second surface 1304 is $D_2$, which is less than the distance $D_1$ shown in FIG. 17. Moreover, the distance $D_2$ is equal to the length $L_3$ of the support beam 1704. In addition, it can be seen that the support arms 1212 are flexed or bent as a result of the application of the compressive force F. As can be appreciated by one of skill in the art, the provision of a central beam 1704 can allow a support element 112 to maintain at least some spacing between adjacent sheets 120, even when significant external forces are applied. For example, in configurations where the integrated multilayer insulation is used to support a vacuum shell, the provision of support elements 112 with a support beam 1704 can be used to maintain acceptable insulation performance while the integrated multilayer insulation structure 100 is in normal Earth atmosphere. Moreover, when the external force is removed, the gap between the free end 1712 of the support beam 1704 and the shield adjacent and/or attached to the second surface 1304 of the support element 1212 is reestablished such that the support element 112 returns to the configuration illustrated in FIG. 17, resulting in increased insulation performance. Accordingly, increased performance can be realized on orbit or when the external force is otherwise removed.

FIGS. 19 and 20 illustrate further embodiments of a support element 112 in accordance with the present invention. In accordance with such embodiments, the support beam 1704 has a Y shaped cross-section. The arms of the Y shaped support beam 1704 can be aligned with the support arms 1504 of the top structure 1208. In addition, the arms of the Y can be arranged so that they fall between the support arms 1212. Such a configuration can increase the support provided by the support element 112 when that support element 112 is subjected to a compressive force, while minimizing the conductance of heat through the support element 112 once the compressive force is removed. In accordance with further embodiments, the support beam 1704 may feature other cross-sectional shapes and/or orientations. For example, the support beam 1704 may comprise a solid or an open (hollow) cylinder.

Figure 21:
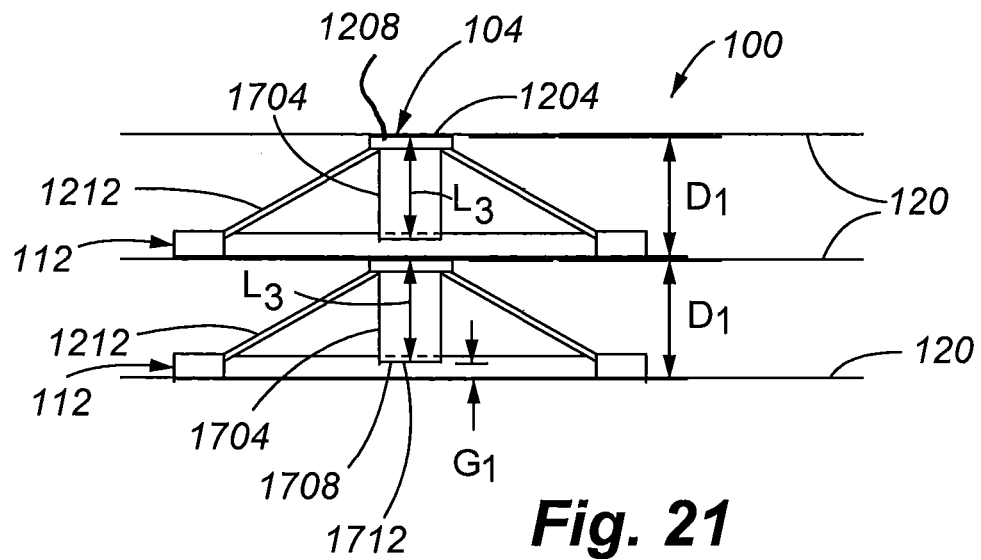
FIG. 21 is a cross-section of an integrated multilayer insulation structure with support elements having support beams in accordance with embodiments of the present invention.
Figure 22:
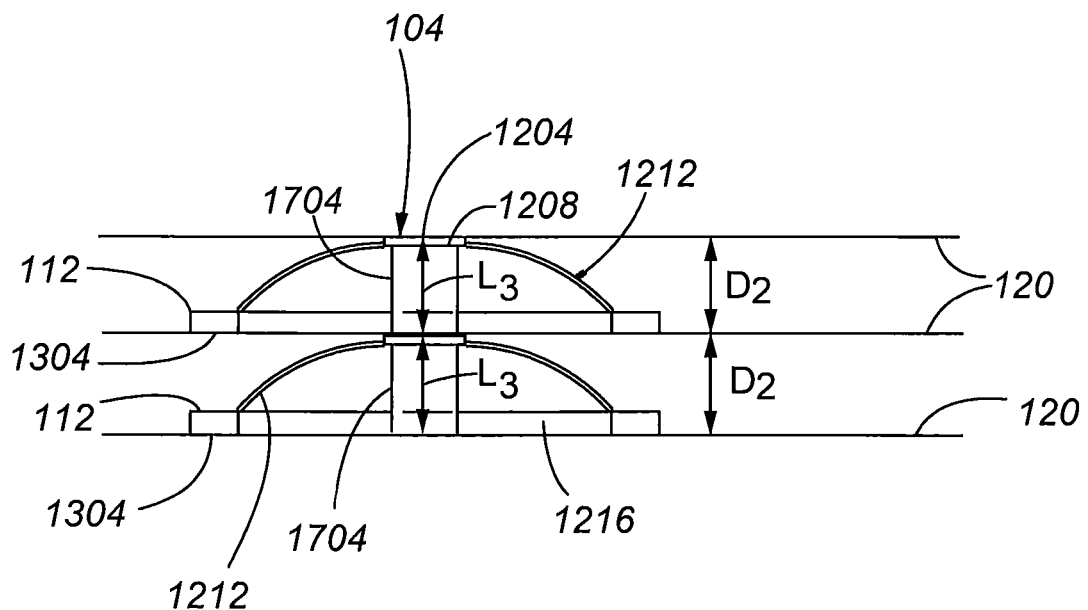
FIG. 22 is a cross-section of the integrated multilayer insulation structure of FIG. 21 under compression.

FIG. 21 illustrates a portion of an IMLI structure 100 in accordance with embodiments of the present invention in cross-section that includes support elements 112 like those illustrated in FIGS. 17 to 20. The IMLI structure 100 in FIG. 21 is not undergoing a compressive force, such that a distance $D_1$ is maintained between adjacent sheets 120, and such that a gap $G_1$ is present between the third surface 1708 at the free end 1712 of each support beam 1704 and the adjacent sheet 120. As a result, the only conductive heat transfer path between adjacent sheets 120 is through the support arms 1212. Moreover, because of the relatively low cross-sectional area to length ratio of the support arms 1212, this conductive path is limited. This is representative of the state of the IMLI structure 100 in a vacuum. FIG. 22 illustrates the IMLI structure 100 of FIG. 21 when a compressive force is applied to that structure 100. In such a condition, the support arms 1212 are bent, compressing the support elements 112 of the support post 104. In addition, the free ends 1708 of the support element 112 support beams 1704 are brought into contact with an adjacent sheet 120. Where a sheet 120 is between two support elements 112, the third surface 1708 at the free end 1712 of the support beam 1704 provided as part of the support element 112 on a first side of the sheet 120 is supported by the first surface 1204 of the support element 112 on a second side of that sheet 120. In this configuration, there is no gap between the third surface 1708 of the support beam 1704 and the adjacent sheet 120. In addition, the distance between adjacent sheets 120 is the distance $D_2$, where $D_2$ is less than $D_1$ (see FIG. 21). Moreover, the bending of the support elements 1212 such that a load is transmitted allows the support beams 1704 of the support elements 112 to create a support post 104 with a contiguous, in-line support structure. In accordance with embodiments of the present invention, the configuration illustrated in FIG. 22 is representative of an IMLI structure 100 in accordance with embodiments of the present invention in which a vacuum is formed within the IMLI structure 100 and while the IMLI structure 100 is under normal atmospheric conditions. Moreover, while the insulation performance of the IMLI system 100 under atmospheric conditions is diminished as compared to when the structure 100 is in a vacuum or under reduced pressure (e.g., as illustrated in FIG. 21), favorable insulation characteristics and resistance to load can be provided.

Methods of forming an IMLI structure 100 in accordance with embodiments of the present invention include providing a plurality of sheets of material 120, each comprising a thermal radiation shield. In addition, a plurality of post elements are provided. A first set of post elements 112 included in the plurality of post elements 112 is interconnected to a first sheet 120 included in the plurality of sheets of material 120. A second sheet 120 is then registered with the first sheet and the first set of post elements 112, and the first set of post elements 112 is interconnected to the second sheet 120. A second set of post elements 112 is registered with the first set of post elements 112 and interconnected to the second sheet 120. In accordance with embodiments of the present invention featuring support posts 104 having post elements 112 that form a continuous, inline support post 104 configuration, registering the first and second sets of post elements includes aligning the first and second sets of post elements 112 so that they correspond to one another when the IMLI structure 100 is considered in plan view. In accordance with embodiments of the present invention in which the support posts 104 are in a staggered configuration, such that gaps along individual support posts 104 are created when the IMLI structure 100 is in a vacuum or otherwise not subjected to full atmospheric pressure, registering the first and second sets of post elements 112 includes aligning the first and second sets of post elements such that, when the IMLI structure 100 is considered in plan view, the first and second sets of post elements 112 do not approximately correspond to one another. Moreover, interconnecting post elements 112 to a sheet 120 can comprise inserting a portion of a post element 112 through a perforation in a sheet 120 and interconnecting that post element 112 to another post element 112 on the opposite side of the sheet 120. Alternatively, post elements can be self piercing, such that a perforation is formed in a sheet when a post element on a first side of a sheet 120 is interconnected to another post element on a second side of the sheet. In accordance with other embodiments of the present invention, post elements 112 or a post element 112 and a post element extension 508 can be aligned with one another and adhered to opposite sides of a sheet 120. In accordance with still other embodiments of the present invention, post elements may be adhered or otherwise bonded to one or two sheets 120 forming the volume 120 in which the post element 112 is situated, while the side of the sheet or sheets 120 opposite the side to which the post element 112 is bonded does not have another post element 112 or extension 508 bonded to it opposite the first post element 112. As can be appreciated by one of skill in the art after consideration of the present disclosure, such methods for forming an IMLI structure 100 can be repeated until a desired number of sheets 120 have been interconnected to one another via post elements 112. If a base layer 108 and/or hermetic layer 124 are to be provided as part of the IMLI structure 100, that structure 100 can be completed by the inclusion and interconnection of such layers 108, 124 with the sheets 120.

In accordance with further embodiments of the present invention, an IMLI structure 100 can be formed by registering a plurality of support elements 112 with a first sheet 120 and by adhering or bonding the first surface 1204 of the plurality of support elements 112 to a first side of the first sheet 120. A second sheet 120 is then registered with the first sheet 120 and adhered or bonded to the second surface 1304 of the support elements 112 on a first side of the second sheet 120. A second set of support elements 112 may then be registered with and adhered to a second side of the second sheet 120. The surface of a support element 112 that is bonded to a particular sheet 120 may be varied, for example by layer and/or location within a layer. In accordance with embodiments of the present invention, the second set of support elements 112 is aligned such that each support element 112 in the first set of support elements 112 is in line with a support element 112 of the second set of support elements 112. Forming an IMLI structure 100 in accordance with embodiments of the present invention can additionally include creating a vacuum within the volume between some or all of the pairs of adjacent sheets 120. This can then result in a net compressive force being applied to the structure 100. Where the support elements 112 include support beams 1704, this can then result in the third surface 1712 of the support beams 1704 being placed into contact with an adjacent sheet 120, such that a continuous structure or post 104 is created, allowing the applied force to be supported. Moreover, by removing the compressive force, for example by placing the IMLI structure 100 into a low pressure environment or a vacuum, the distance between adjacent sheets may be expanded, and a gap between the free end 1708 of the support beams 1704 and adjacent sheets 120 can be established.

For purposes of illustration, and without limitation, an exemplary IMLI structure 100 in accordance with embodiments of the present invention may feature a base layer 108 that is a sheet of metal or polymer that is about 1-20 mils thick. In addition, the first layer or course of post elements 112 can be molded into or as part of the base layer 108. The first layer of post elements 112 may also be bonded directly to the object being insulated. The height of each post element body 308 can be about 40 to 80 mils, and the width or diameter of each post element 112 can likewise be about 40 to 300 mils. In accordance with embodiments of the present invention, the radiation shields or sheets 120 internal to the IMLI structure 100 can have a thickness of from about 0.10 to 5.0 mil. In accordance with further embodiments of the present invention, the radiation shields or sheets 120 internal to the IMLI structure 100 can have a thickness of from about 0.25 to 5.0 mil. The top or outer layer of insulation 124 can have a thickness of about 1.0 to 20 mils thick. The total number of sheets or layers 120 in the exemplary structure can be 5 to 10 layers with about 10 layers per centimeter of thickness. Additional structures of 5 to 10 layers can be added as required to achieve the required thermal insulation. In accordance with other embodiments, an IMLI structure may have up to 120 layers 120. As a further example, an IMLI structure 100 in accordance with embodiments of the present invention may have any number of layers 120. The spacing between adjacent support posts 104 can vary depending on the height of the post elements 112, thickness of the sheets 120, structural loads, the thermal performance requirements and other factors. In accordance with exemplary embodiments of an IMLI structure 100 as described herein, spacing between adjacent support posts 104 may be from about 1 cm to about 10 cm.

The support arms or spokes 1212 may feature an ultra low cross-section. For example, the cross-sectional area A may be about 0.00008 square inches, and the length L of each support arm 1212 may be about 0.175 inches. This results in an area to length ratio of 0.00046. The support posts 112 may be formed from a micro molded polymer, ceramic, glass, or other insulators. Although certain configurations of support posts 112 have been illustrated, it should be appreciated that these examples are not intended to be limiting. In particular, other configurations are possible. For instance, more than three support arms 1212 may be provided. In addition, a base structure 1216 need not be annular. Moreover, the second surface 1304 can be formed by the ends of the support arms 1212, and is not required to be associated with any base structure 1216. In addition, the second surface 1304 need not comprise a planar surface. Alternatively or in addition, a first surface 1204 can be formed from the ends of the support arms 1212 opposite the ends of the support arms that form or are proximate to the second surface 1304.

The IMLI described here can operate in-atmosphere, and have terrestrial applications such as liquid oxygen containers for medical use, liquid nitrogen and liquid helium storage tanks (dewars) for medical uses (MRI) and research uses requiring cryogenic temperatures, for building insulation, insulation shipping and storage containers, refrigerators, freezers and water heaters. In accordance with still other embodiments, post elements 112 can be metalized and/or formed from conductive materials to provide a conductive insulating blanket or IMLI 100 structure.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A multilayer thermal insulation support element, comprising:
   a first support surface corresponding with a first plane and defined by a top structure;
   a second support surface corresponding with a second plane and defined by a base structure, wherein the first support surface is separated from the second support surface by at least a first distance and wherein the first and second planes are parallel to one another;
   a plurality of support arms interconnecting the first support surface to the second support surface, wherein each support arm in the plurality of support arms has a length that is greater than the first distance, the plurality of support arms extend radially from the top structure and define a substantially conical section;
   wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and
   a support member operably coupled with the first support surface, the support member extending toward the second plane defined by the second support surface, the support member having a length of about the second distance.

2. The support element of claim 1, wherein the plurality of support arms are flexible, and wherein the plurality of support arms are flexed in the second load condition and further wherein the support member engages a surface at the plane in the second load condition.

3. The support element of claim 1, wherein three support arms are included in the plurality of support arms, and wherein the support arms form a tripod.

4. A multilayer thermal insulation support element, comprising:
   a first support surface corresponding with a first plane and defined by a top structure;
   a second support surface corresponding with a second plane and defined by a base structure, wherein the first support surface is separated from the second support surface by at least a first distance and wherein the first and second planes are parallel to one another, the base structure is a ring;
   a plurality of support arms interconnecting the first support surface to the second support surface, wherein each support arm in the plurality of support arms has a length that is greater than the first distance, the plurality of support arms extend radially from the top structure and define a substantially conical section;
   wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and
   a support member operably coupled with the first support surface, the support member extending toward the second plane defined by the second support surface, the support member having a length of about the second distance.

5. A multilayer thermal insulation support element, comprising:
   a first support surface corresponding with a first plane and defined by a top structure, the top structure includes a plurality of support surface elements;
   a second support surface corresponding with a second plane and defined by a base structure, wherein the first support surface is separated from the second support surface by at least a first distance and wherein the first and second planes are parallel to one another;
   a plurality of support arms interconnecting the first support surface to the second support surface, wherein each support arm in the plurality of support arms has a length that is greater than the first distance, the plurality of support arms extend radially from the top structure and define a substantially conical section;
   wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and
   a support member operably coupled with the first support surface, the support member extending toward the second plane defined by the second support surface, the support member having a length of about the second.

6. The support element of claim 5 wherein the plurality of support surface elements comprise a plurality of support surface beams extending radially from the first support surface at an acute angle relative to the plurality of support arms, the support surface beams configured to engage an insulating layer.

7. A multilayer thermal insulation support element, comprising:
   a first support surface;
   a second support surface, wherein the first support surface is separated from the second support surface by at least a first distance;
   a plurality of support arms interconnecting the first support surface to the second support surface, wherein each support arm in the plurality of support arms has a length that is greater than the first distance;
   wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and
   a support member comprising a support beam operably coupled with the first support surface, the support member extending toward a plane defined by the second support surface, the support member having a length of about the second distance and less than the first distance.

8. The support element of claim 7, wherein the support beam extends from a top structure, wherein the support beam is centered between the plurality of support arms.

9. A multilayer thermal insulation structure, comprising:
   a plurality of sheets;
   a plurality of support elements, the plurality of support elements including a first support element, the first support element including:
      a first support surface, wherein a first sheet included in the plurality of sheets is in contact with the first support surface;

a second support surface, wherein a second sheet included in the plurality of sheets is in contact with the second support surface;

a plurality of support arms interconnecting the first support surface and the second support surface;

the first support surface is separated from the second support surface by at least a first distance, each support arm in the plurality of support arms has a length that is greater than the first distance, the plurality support arms separating the first support surface from the second support surface by the first distance in a first load condition, the plurality of support arms deflecting to separate the first support surface from the second support surface by a second distance less than the first distance in a second load condition; and the first support element includes a central support member extending toward the second support surface, the central support member having a length of about the second distance.

10. The structure of claim 9, wherein a second support element included in the plurality of support elements has a first support surface in contact with the second sheet and a second support surface in contact with a third sheet included in the plurality of sheets.

11. The structure of claim 10, wherein the second support surface of the first support element that is in contact with a first side of the second sheet, and wherein the first support surface of the second support element is in contact with a second side of the second sheet adjacent the second support surface of the first support element.

12. The structure of claim 9, wherein a second support element included in the plurality of support elements has a first support surface in contact with the first sheet and a second support surface in contact with the second sheet.

13. The structure of claim 9, wherein at least some of the support elements in the plurality of support elements include a support beam.

14. The structure of claim 11, wherein the first and second support elements each include the central support member extending from the first support surface of the respective support element, wherein in a first state the central support member of the first support element is not in contact with the second sheet, and wherein in a second state the central support member of the first support element is in contact with the second sheet and aligned with the central support member of the second support element.

15. The multilayer thermal insulation structure of claim 14 wherein:

the first support surface is separated from the second support surface by at least a first distance;

the plurality of support arms interconnecting the first support surface and the second support surface of each of the first and second support elements comprise at least three support arms, each of the at least three support arms having a length greater than the first distance; and the first sheet defining a hermetic layer and the second sheet defining a metalized polymer sheet, the second state defining a vacuum state with a compressive force on the first and second support elements such that the first support element flexes such that the central support element of the first support element interacts with the central support element of the second support element to form a contiguous in-line support structure supporting the hermetic layer under the compressive force.

16. The structure of claim 9, wherein the first support surface of the first support element defines a first plane, and wherein the support arms extend from a first support structure providing the first support surface such that an obtuse angle is formed between any two of the support arms included in the plurality of support arms.

17. The structure of claim 9, wherein the plurality of sheets and the plurality of support elements are metalized such that at least a portion of the structure is electrically conductive.

18. The multilayer thermal insulation structure of claim 9 wherein:

the plurality of support arms are flexible and bend in the second load condition, the degree of bending determined in part by the length of the central support member; and the plurality of support arms are fixedly attached to the second support surface, the second support surface being substantially rigid such that the plurality of support arms bend between the first support surface and second support surface in the second load condition.

19. A multilayer thermal insulation support element, comprising:

a first support surface;

a second support surface, wherein the first support surface is separated from the second support surface by at least a first distance;

a plurality of support arms interconnecting the first support surface to the second support surface, wherein each support arm in the plurality of support arms has a length that is greater than the first distance;

wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and a support member operably coupled with the first support surface, the support member extending toward a plane defined by the second support surface, the support member having a length of about the second distance, wherein the support member defines a Y-shaped cross-section.

20. A multilayer thermal insulation support element, comprising:

a first support surface;

a second support surface, wherein the first support surface is separated from the second support surface by at least a first distance;

a plurality of support arms interconnecting the first support surface to the second support surface, wherein each support arm in the plurality of support arms has a length that is greater than the first distance;

wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and a support member operably coupled with the first support surface, the support member extending toward a plane defined by the second support surface, the support member having a length of about the second distance;

wherein at least one of the first support surface, the second support surface or the plurality of support arms are a metalized micromolded polymer.

21. A multilayer thermal insulation support element, comprising:

a first support surface;

a second support surface, wherein the first support surface is separated from the second support surface by at least a first distance;

a plurality of support arms interconnecting the first support surface to the second support surface, wherein each support arm in the plurality of support arms has a length that is greater than the first distance;

wherein the plurality of support arms separate the first support surface from the second support surface by the first distance in a first load condition, wherein the plurality of support arms deflect to separate the first support surface from the second support surface by a second distance in a second load condition, and wherein the first distance is greater than the second distance; and a support member operably coupled with the first support surface, the support member extending toward a plane defined by the second support surface, the support member having a length of about the second distance;

wherein a cross-sectional area of one of the plurality of support arms is about 0.00008 square inches and a length of the one support arms is about 0.175 inches.

* * * * *